Jan. 30, 1962   T. G. PERRICCI   3,018,627
RECHARGEABLE ACCUMULATOR
Filed April 17, 1958   2 Sheets-Sheet 1

INVENTOR.
THOMAS G. PERRICCI
BY
ATTORNEY

United States Patent Office 3,018,627
Patented Jan. 30, 1962

3,018,627
RECHARGEABLE ACCUMULATOR
Thomas G. Perricci, Fullerton, Md., assignor to Martin-Marietta Corporation, a corporation of Maryland
Filed Apr. 17, 1958, Ser. No. 729,149
14 Claims. (Cl. 60—51)

This invention relates to a rechargeable accumulator designed for use in a guided missile or aircraft, and more particularly to a self-recharging pump accumulator rechargeable in flight to supply pressurized fluid for use in operating the aerodynamic control surfaces of the guided missile or aircraft, as well as for use by other components in the system.

The power required to actuate the guidance system and aerodynamic control surfaces of a guided missile are usually provided by means of a power supply auxiliary, such as for example of the type described in Patent No. 2,723,528, issued November 15, 1955, to Sidney Stark et al., assigned to the assignee of this application, and entitled "Auxiliary Power Package." That patent discloses a power supply auxiliary wherein a solid propellant charge, of the type commonly used for rocket propulsion, is continuously burned to produce a gas at a highly regulated pressure. The pressurized gas thus produced is employed to drive a turbine which in turn drives an alternator for generating the required electrical energy. The gas is also employed to pressurize a hydraulic reservoir which provides the required hydraulic power.

The power supply disclosed in the Stark patent has proven to be adequate for a missile for relatively short flight duration, for example a missile of the air-to-air type. With a missile of longer flight duration, however, the volume and weight of solid propellant charge required by the Stark gas generator may become so large as to conflict with the aerodynamic design requirements of the missile.

Another approach to the problem has been to provide in missiles a power supply auxiliary particularly designed for use in a long-flight-duration missile, such as the pressurized gas generator disclosed in application S.N. 722,111, filed December 27, 1957, in the name of Rudolph A. Matheisel, and assigned to the assignee of this application.

The present invention utilizes some of the advantages of each of the aforementioned inventions so as to provide a light-weight, very versatile rechargeable pump accumulator admirably suited for employment in a guided missile for providing pressurized fluid for use therein over a flight path of long duration, as well as for use in the hydraulic system of an aircraft, either as a sole accumulator, or in conjunction with an accumulator of the prior art type usually employed.

The improved pump accumulator arrangement according to this invention is adapted to effect a conversion into pressurized fluid of working increments of a propellant charge, only as required for operation of control equipment in a missile or aircraft. To this end, the present arrangement employs at least one solid propellant charge arranged when triggered to bring about recharging of the accumulator. In accordance with the working increment principle, a charge unit is ignited whenever the pressure of the system is depleted to a predetermined working pressure minimum.

The solid propellant charges may be in the nature of one or more cartridges associated with a portion of the self-recharging pump accumulator, and upon ignition of a cartridge, such as by the use of an electrical ignition arrangement, a piston in the accumulator is caused to move in such a manner as to refill the accumulator portion of the device, drawing pressure fluid from a fluid reservoir in so doing. The movement of the piston arrangement at the same time compresses a suitable bias that functions to pressurize the fluid for use in the system. The propellant charges may be arranged to be individually ignited in a preselected manner automatically upon the fluid pressure in the system reaching a certain low value, such as when the missile has reached an intermediate portion of its flight, or in the case of an aircraft, if hydraulic pressure reaches a low value due to pump failure or the like. In an aircraft, this automatic arrangement can be supplemented by a pilot-actuated detonating arrangement so that the pilot can operate the recharging arrangement in the event that the automatic means for operating the device fails to function.

It is therefore to be seen that the present arrangement is adapted to be used in guided missiles as the prime source of fluid power required in control functions, as well as functioning as an arrangement for assisting or replacing the pump utilized in an aircraft. In the case of use in an aircraft wherein space and weight is particularly limited, the present recharging pump accumulator arrangement may be substituted for the duplicate emergency hydraulic systems often used in miliary aircraft, thereby accomplishing a weight and cost saving.

The invention can be better understood by referring to the following drawings in which.

Figure 1:
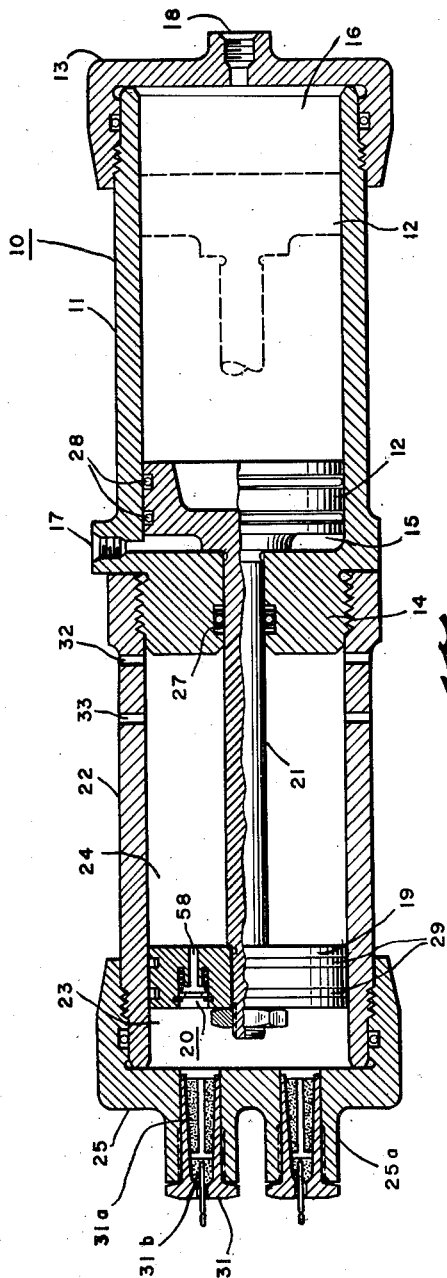
FIGURE 1 is a view, partly in section, illustrating a typical rechargeable pump accumulator according to this invention.

Referring to the drawings, FIGURE 1 shows a typical embodiment of a rechargeable pump accumulator 10 according to this invention. A hollow vessel in the form of a cylinder 11 is here illustrated, with a piston member 12 operable therein over a portion of the length of the cylinder. As illustrated, a suitable closure member 13 on the right hand end of cylinder 11 and a partition member 14 secured near the other extreme of travel of piston 12, define the accumulator portion of the device.

Piston 12 further divides the accumulator portion into an expansible fluid chamber 15 and a biasing chamber 16, and an orifice 17 is provided in the wall of cylinder 11 opening into the fluid chamber so that as piston 12 moves to the right in FIGURE 1, a charge of hydraulic fluid will be caused to enter chamber 15 from the hydraulic system, as hereinafter explained. At the same time that piston 12 is moving so as to draw in a charge of hydraulic fluid, it is simultaneously compressing a biasing means. In the device illustrated in FIGURE 1, the biasing means may be a compressible fluid trapped in chamber 16, so that by the time the piston 12 has reached the dotted line position shown in FIGURE 1, a considerable amount of potential energy will be stored in the compressible fluid to serve as a pressurizing means for the charge of hydraulic fluid now contained in chamber 15. The compressible fluid may of course be air, and through a suitable check valve associated with port 18 in closure member 13, a desirable amount of precharging of chamber 16 may be achieved. Although a compressible fluid is the preferred medium for storing potential energy for the biasing of piston 12 to pressurize hydraulic fluid contained in fluid chamber 15, it is to be understood that a biasing means in the nature of a spring (not shown) may be employed for pressurizing the hydraulic fluid if desired.

Motion of piston 12 in the charging direction is preferably accomplished by the use of a double piston arrangement, and to that end a second piston 19 is employed which is connected by piston rod 21 to piston 12. Piston 19 is operable in an elongated hollow cylinder 22 which may be secured to cylinder 11 such as by screwing the members together in a fluid-tight manner. It is to be noted that the cylinders may be of the same or similar diameter, although this is not necessarily a requirement.

The piston 19 divides the charging portion of the device into an expansion chamber 23 and an air escape chamber 24. A closure member 25 is provided for the end of cylinder 22 remote from the accumulator portion of the device, and partition 14, previously mentioned, separates the respective interiors of cylinder 11 and cylinder 22. Partition 14 is provided with an opening through which piston rod 21 is movable, in which opening an O-ring 27 or the like may be provided to insure a sealed relation. Suitable O-rings 28 or other appropriate seals are also provided on piston 12, and piston rings 29 preferably of metal are provided on piston 19 so each piston will operate in a sealed manner in its respective cylinder.

Although a mechanical triggering arrangement could be employed, I have found it convenient to use one or more electrically ignited gas generator cartridges 31 for driving piston 19 so as to bring about the motion of piston 12 in the charging direction. These cartridges are screw threaded into boss-like portions 25a on the exterior of closure 25, and may consist of propellant portion 31a and ignition or squib portion 31b. Suitable electrical or electro-mechanical means are employed to cause ignition of the charge, and the expanding gases resulting from such ignition rapidly fill expansion chamber 23, causing the piston arrangement to move to the right as shown in FIGURE 1, and thereby bring about recharging of the accumulator. As should be obvious, the closure member 25 can be provided with a number of propellant charge chambers, each containing a charge or cartridge capable of being separately ignited. Such an arrangement would typically be employed in a missile adapted for flights of long duration, with a new propellant charge being ignited each time additional pressure fluid is needed.

Suitable air escape ports 32 are provided in cylinder 22 so that the motion of the pistons in the charging direction will not be impeded by air trapped in chamber 24. So that residual pressure will not be maintained in expansion chamber 23, suitable gas escape ports 33 are provided in cylinder 22 so that by the time piston 19 has reached the extreme righthand position in cylinder 22, any pressure remaining will be allowed to escape.

Figure 2:
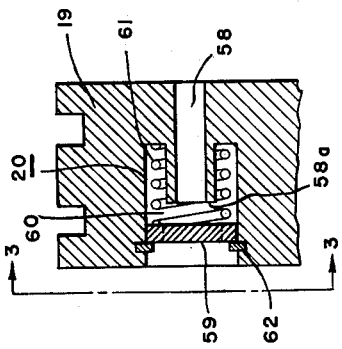
FIGURE 2 is an enlarged view of the air-escape valve incorporated in a piston of the device illustrated in FIGURE 1.
Figure 3:
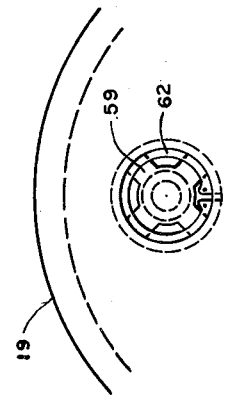
FIGURE 3 is a view of the air-escape valve of FIGURE 2, taken in the direction of arrows 3—3.

To prevent the trapping of air or gas in chamber 23 so as to impede motion of the pistons to the left as pressure fluid in chamber 15 is utilized in the system, an air escape valve 20 is utilized in piston 19, as shown in detail in FIGURES 2 and 3. An orifice 58 extends through piston 19, which is capable of being closed by the seating of valve disc 59 thereagainst. Cavity 60 is provided in the piston, in which disc 59 is longitudinally movable under the influence of bias spring 61. Snap ring 62 prevents loss of the disc from the cavity.

Spring 61 is strong enough to normally hold valve disc 59 out of seating engagement with seat 58a of orifice 58, so that air contained in chamber 23 can pass through orifice 58 and into chamber 24 as the piston moves to the left. However, as it is not desired that pressure escape from chamber 23 until the pistons have been driven to the extreme right hand end of their travel, spring 61 is selected so that it will be overcome at the time of ignition of the gas-generating charge, so that the valve disc can seat tightly against seat 58a, and thus allow the pressure in chamber 23 to be effectively utilized.

Figure 4:
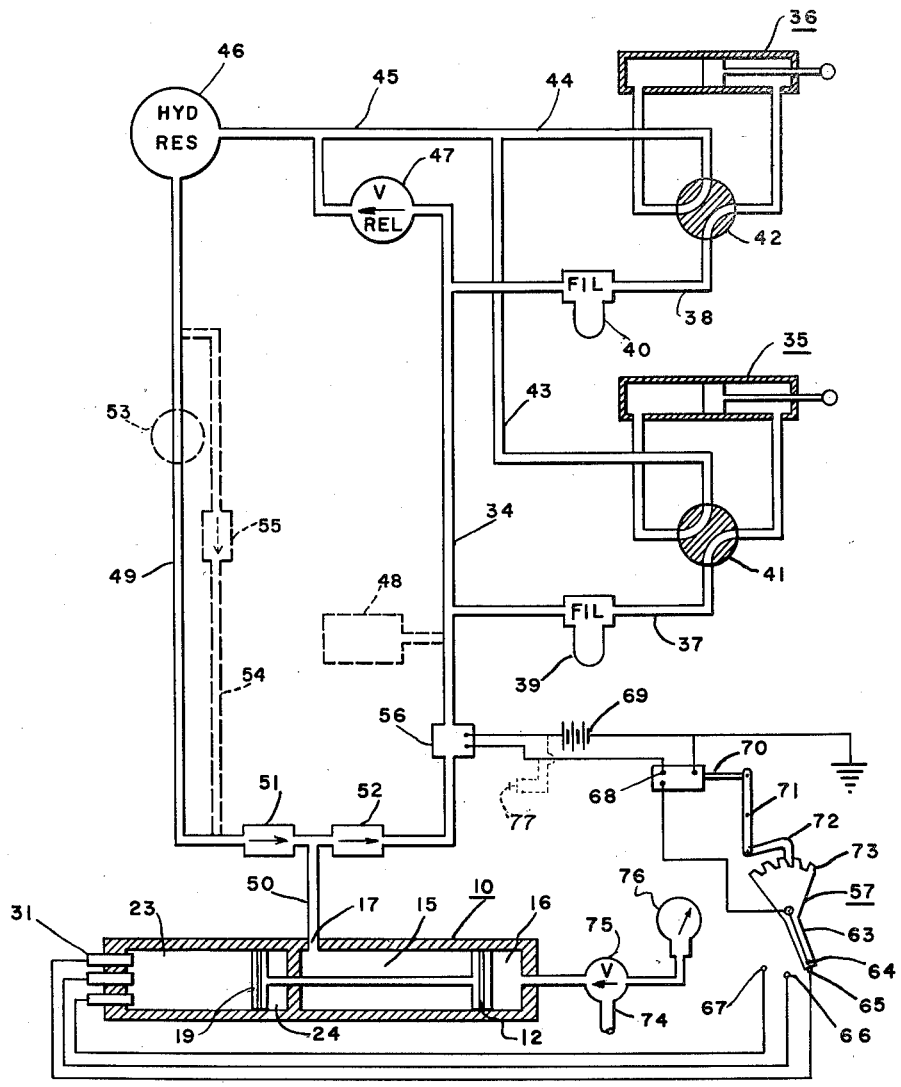
FIGURE 4 is a schematic diagram of a typical hydraulic control system with which the present invention may be utilized.

Referring now to FIGURE 4, a preferred system with which this pump accumulator will be used is there shown. As previously indicated, the present pump accumulator can be utilized in a hydraulic system in which no pump is utilized, such as in a guided missile, and in that event, the accumulator is typically precharged at the time of launching of the missile so that the flight controlling surfaces of the missile and other components can be actuated a number of times during flight. A fluid line 34 connects the fluid chamber 15 of the accumulator with actuators 35 and 36, which, for example, would be typically connected to oppositely placed flight controlling surfaces of the missile or aircraft. Fluid lines 37 and 38 lead from line 34 to actuators 35 and 36, respectively, with filters 39 and 40 typically being located in such lines. Valves 41 and 42 are provided for porting hydraulic fluid to the correct end of their respective actuators 35 and 36 so as to bring about desired motion of the flight controlling surfaces, the positioning of these control valves being of course typically under the command of the guidance system in the case of a missile, or the pilot in the case of a manned aircraft. Return lines 43 and 44 leading from actuators 35 and 36 meet in a common return line 45 leading to hydraulic reservoir 46. A relief valve 47 may be provided between pressure line 34 and return line 45 so that excessive pressure can bypass the actuators and can be directed to reservoir 46. An additional accumulator 48 may also be employed to supplement the accumulator function obtained according to the present invention, but inasmuch as the additional accumulator is not necessarily a requirement of the system, accumulator 48 has been shown in dashed lines.

Fluid line 49 connects the reservoir to orifice 17 of fluid chamber 15 of the accumulator, and a check valve 51 in line 49 prevents the undesired flow of fluid toward the reservoir. A check valve 52 is located in line 34 to prevent fluid being drawn from this line during the recharging stroke of the accumulator 10.

If the fluid system is provided with a hydraulic pump, such as would typically be the case in the event this invention is employed in an aircraft, a pump 53 is preferably placed in fluid line 49 intermediate the reservoir and the check valve 51, this pump being driven such as by a driving connection with one of the engines of the aircraft, or from the electrical system thereof. A bypass 54 equipped with a check valve 55 is provided around pump 53 so that in the event of pump failure, the accumulator can be recharged without it being necessary to attempt to draw fluid through pump 53. Since items 53, 54 and 55 would typically not be necessitated in a missile, they are illustrated in dashed lines in FIGURE 3.

A pressure switch 56 is provided in line 34 to sense the pressure therein, and should the pressure reach a certain minimum value, the appropriate signal is sent by means of electrical switch device 57 to a first cartridge 31 located in closure member 25, so as to cause the charge to ignite and create gas pressure in chamber 23 to bring about charging of the accumulator. Electrical switch device 57 may comprise a pivoted distribution arm 63, on one end of which is an electrical contact 64, arranged to successively engage fixed electrical contacts 65, 66 and 67 as the distribution arm is indexed to various positions. A solenoid 68 is provided for the indexing of the distribution arm, and each time pressure switch 56 senses a certain minimum pressure, an internal electrical contact is closed, completing a circuit from power source 69 (such as a battery) to cause armature 70 of the solenoid to pick up. This motion of armature 70 causes link 71 to pivot so as to cause pawl 72 to engage the notched end 73 of arm 63 so as to index it to a position in which its contact 64 engages first contact 65. This completes a circuit from the electrical power source through the contact portion of arm 63 and wiring associated with contact 65 to first cartridge 31, causing its ignition and the consequent recharging of fluid chamber 15 of the accumulator. When the fluid in chamber 15 has been dissipated such as by the operation of actuators 35 and 36, pressure switch 56 operates to again complete an electrical circuit with solenoid 68, causing it to pick up and bring about indexing of arm 63 so as to move contact 64 into engagement with fixed contact 66, this of course causing a second cartridge to be ignited, and the accumulator to again be recharged. This process is continued until the mission has been completed, or until all cartridges have been ignited. If desired, the recharging of the accumulator can also be under control of the pilot in a manned aircraft, so that in the event of malfunction of the automatic recharging arrangement, the pilot could still bring about recharging of the accumulator so as to provide him with sufficient fluid pressure in the system to bring about safe landing of the aircraft. Accordingly, switch 77 may be provided as shown in dashed lines.

As of course will be obvious to those acquainted with hydraulic fluid systems, instead of the common fluid connection 50 between the accumulator and fluid line 34, separate lines and a separate inlet and outlet in the accumulator may be used to connect the fluid chamber 15 with line 49 from the reservoir, and fluid line 34 leading to the actuators.

The operation of this invention is as follows:

The fluid system is preferably precharged with fluid pressure before launching of a missile equipped with this arrangement, to such an extent that chamber 15 is filled with hydraulic fluid, and accumulator 48, if used, is full. Also, biasing chamber 16 is filled through port 18, this being accomplished through filling tube 74 associated with precharging valve 75, pressure gauge 76 being installed to indicate the pressure in chamber 16. In the event of a manned aircraft, however, the pump 53 is operating continuously or at least almost continuously so as to keep the accumulator or accumulators in the filled condition, so such involved precharging is not necessary. During flight, if fluid pressure in line 34 drops below a certain minimum, pressure switch 56 is actuated to cause ignition of a charge 31, and such ignition causes an expansion of gases in chamber 23, thereby driving piston 12 in such a manner as to cause a charge of hydraulic fluid to be drawn from reservoir 46 through line 49 and check valve 51 into line 50 and into chamber 15. This piston motion also causes compression of the compressible fluid contained in chamber 16 so as to bring about the storing of a source of pressure for pressurizing the charge of fluid so drawn in. This pressure can now manifest itself through line 34 for use by the actuators. This recharging process can of course recur a number of additional times, depending on the number of propellant charges contained in the closure member 25 and the flight duration of the missile.

I claim:

1. An intermittently-operable pump-accumulator device for supplying hydraulic fluid on a demand basis comprising a hollow vessel, a piston member operable therein over a portion of the length of the vessel, an aperture in said vessel through which a charge of hydraulic fluid may be drawn into said vessel as a result of piston travel in the direction away from said aperture, biasing means in the form of a charge of compressible fluid trapped in a closed portion of said vessel, said biasing means being arranged to act upon a portion of said piston and thereby tend to pressurize said hydraulic fluid, and actuating means arranged to drive said piston in the charging direction to draw hydraulic fluid into said vessel and at the same time cause potential energy to be stored in said biasing means, said actuating means being isolated from said piston to avoid contaminating said hydraulic fluid, whereby a charge of hydraulic fluid under pressure can be furnished for use in a system to which said pump-accumulator device is connected.

2. A pump-accumulator device as defined in claim 1 in which said actuating means is a propellant charge arranged, upon ignition, to drive said piston in the charging direction.

3. A pump-accumulator device as defined in claim 1 in which a second piston is connected by a piston rod to the first recited piston, and said actuating means is a propellant charge that when ignited acts upon said second piston to drive said first recited piston in the charging direction.

4. An intermittently-operable pump-accumulator device for supplying hydraulic fluid on a demand basis comprising a hollow cylinder having a closed end, a piston operable in said cylinder over a portion of the length of the cylinder, a partition in said cylinder on the other side of said piston with respect to said closed end and defining with said piston a fluid chamber, an aperture in said cylinder through which hydraulic fluid may be drawn into said fluid chamber as a result of piston travel in said cylinder in the direction toward said closed end, a piston rod passing through said partition in sealed relation and connected to said piston, a compressible fluid trapped in the cylinder between said piston and said closed end to act as a pressurizing means for hydraulic fluid drawn into said cylinder as a result of travel of said piston in the charging direction, and actuating means attached to said piston rod for moving said piston in the charging direction, said actuating means being isolated from said piston by said partition, thereby preventing contamination of said hydraulic fluid, whereby said pump-accumulator device may be recharged so as to place a charge of hydraulic fluid under pressure for subsequent use in a hydraulic system.

5. The pump-accumulator device as defined in claim 4 in which said actuating means includes a propellant charge to be ignited when recharging of said pump-accumulator device is to be accomplished.

6. An intermittently-operable pump-accumulator device for supplying hydraulic fluid on a demand basis comprising a hollow vessel, a partition member dividing the interior of said vessel into an accumulator portion and a charging portion, a piston operable in said accumulator portion and having a piston rod attached thereto, said piston rod passing through said partition member in sealed relation, said piston dividing said accumulator portion into a fluid chamber and a biasing chamber, an aperture in said vessel through which hydraulic fluid may be drawn into said fluid chamber as a result of piston travel in the direction away from said aperture, such piston travel simultaneously compressing a biasing means contained in said biasing chamber, and means operatively associated with said charging portion and connected to said piston rod for causing said piston to move in the charging direction so as to draw in a charge of hydraulic fluid and to compress the biasing means whereby to make available a charge of hydraulic fluid under pressure to a hydraulic system with which said pump-accumulator device may be connected, said means associated with said charging portion being a propellant charge isolated by said partition from the hydraulic fluid, thereby preventing contamination of the fluid.

7. The pump-accumulator device as defined in claim 6 in which said means includes a second piston connected to said piston rod on the side of said partition opposite said first piston, and a propellant charge arranged, when ignited, to drive said pistons in the charging direction.

8. The pump-accumulator device as defined in claim 7 in which a plurality of propellant charges are arranged to be selectively ignited so that said accumulator portion may be recharged a plurality of times.

9. An intermittently-operable pump-accumulator device for supplying hydraulic fluid on a demand basis comprising at least one fluid actuator, a rechargeable accumulator for supplying said actuator with hydraulic fluid under pressure, said accumulator comprising a hollow vessel, a piston operable therein over a portion of the length of the vessel, an aperture in said vessel through which hydraulic fluid may be drawn into said vessel as a result of piston travel in said vessel in the direction away from said aperture, biasing means arranged to act upon the side of said piston remote from said hydraulic fluid, and thereby tend to pressurize the fluid, and actuating means arranged to drive said piston in a charging direction to draw hydraulic fluid into said vessel and at the same time cause potential energy to be stored in said biasing means, said actuating means being isolated from said hydraulic fluid to prevent the contamination thereof, whereby said accumulator can furnish hydraulic fluid under pressure to said hydraulic system, and means associated with actuating means for causing recharging of said accumulator upon the pressure in said system reaching a certain minimum.

10. The hydraulic system as defined in claim 9 in which latter recited means includes a plurality of cartridges arranged to be ignited in a pre-established manner so that said accumulator may be recharged a plurality of times.

11. The hydraulic system as defined in claim 9 in which said system includes a hydraulic pump and a reservoir, a bypass line around said pump and forming a fluid connection from said reservoir to said vessel, so that said accumulator can be recharged with fluid from said reservoir in the event of pump failure.

12. An intermittently-operable pump-accumulator device for supplying hydraulic fluid on a demand basis comprising an elongated housing subdivided by a partition into an explosion chamber and an accumulator chamber, first and second pistons operably disposed in sliding relationship in said housing on opposite sides of said partition, said pistons being interconnected by a piston rod passing in sealed, slidable relationship through said partition, recharging means including a plurality of cartridges, arranged upon the detonation of a cartridge to drive said first piston in a charging direction across said explosion chamber toward said partition, said second piston being simultaneously driven across said accumulator chamber away from said partition, energy-storage means arranged to be compressed by said second piston as it is moved in said charging direction, for biasing said pistons in the direction opposite to said charging direction, means for admitting hydraulic fluid into said accumulator chamber between said partition and said second piston as said second piston is moved in the charging direction, the charge of hydraulic fluid drawn into said accumulator each time a cartridge means is detonated being pressurized by said second piston as acted upon by said energy storage means, and means in said housing through which said pressurized fluid may be withdrawn on a demand basis, with the rate of movement of said pistons in the fluid-dispensing direction being determined by the rate at which fluid is demanded.

13. The device as defined in claim 12 in which means for selectively detonating said cartridges are provided, said means being actuated as a result of the pressure of said hydraulic fluid reaching a pre-established minimum.

14. The pump-accumulator device as defined in claim 12 in which said means for admitting hydraulic fluid into said accumulator chamber is interconnected with a hydraulic fluid line of a fluid system in which at least one hydraulic actuator is selectively operated, means in said line for sensing when the pressure of said hydraulic fluid reaches a pre-established minimum, and means operated by said pressure sensing means for selectively operating said recharging means so that by the operation of said pump-accumulator device, the pressure in said hydraulic line can be raised to the desired operating value.

References Cited in the file of this patent

UNITED STATES PATENTS

| | | |
|---|---|---|
| 731,241 | Steiner | June 16, 1903 |
| 1,271,712 | Humphrey et al. | July 9, 1918 |
| 2,269,097 | Garday | Jan. 6, 1942 |
| 2,433,328 | Beale | Dec. 30, 1947 |
| 2,454,138 | Delzer | Nov. 16, 1948 |
| 2,573,993 | Sedgwick | Nov. 6, 1951 |
| 2,652,781 | Deardorff | Sept. 22, 1953 |
| 2,723,528 | Stark et al. | Nov. 15, 1955 |
| 2,742,759 | Flanigen et al. | Apr. 24, 1956 |
| 2,745,357 | Strayer | May 15, 1956 |
| 2,816,822 | Hess et al. | Dec. 17, 1957 |